United States Patent
Kanda et al.

[15] 3,697,866
[45] Oct. 10, 1972

[54] AUTOMATIC NON-DESTRUCTIVE CASE DEPTH MEASURING INSTRUMENT

[72] Inventors: Kimio Kanda, Hitachi; Kunio Ono, Katsuta, both of Japan

[73] Assignee: Hitachi, Ltd., Tokyo, Japan

[22] Filed: Nov. 19, 1970

[21] Appl. No.: 90,997

[30] Foreign Application Priority Data

Nov. 21, 1969    Japan ...................... 44/92954

[52] U.S. Cl. ............................................... 324/34 R
[51] Int. Cl. ............................................ G01r 33/12
[58] Field of Search ................... 324/34 R, 34 H, 40

[56] References Cited

UNITED STATES PATENTS

3,490,033   1/1970   Elarde ..................... 324/34 R
3,586,963   6/1971   Arrott et al. ............ 324/34 R

FOREIGN PATENTS OR APPLICATIONS

1,076,168   7/1967   Great Britain ........... 324/34 H

OTHER PUBLICATIONS

McMaster, R., Nondestructive Test. Hand.; Vol. II, The Ronald Press; 1963; pp. 34.1, 34.2, 34.3

*Primary Examiner*—Robert J. Corcoran
*Attorney*—Craig, Antonelli & Hill

[57] ABSTRACT

A testing instrument for automatically non-destructively determining the hardened depth in accordance with the coercive force of a steel by periodically impressing a D.C. magnetic field externally on the steel by energizing an electromagnet from a D.C. source, measuring the magnetic flux density of said D.C. magnetic field by means of a Hall element while varying the magnetomotive force of said field, integrating the measured value of magnetic flux density, applying the integrated value to the electromagnet alternately with connection of the D.C. source to the electromagnet and reading the value of the magnetomotive force to said field at the point when the magnetic flux density has reached zero or a prescribed value.

10 Claims, 5 Drawing Figures

AUTOMATIC NON-DESTRUCTIVE CASE DEPTH MEASURING INSTRUMENT

BACKGROUND OF THE INVENTION

1. Field of the Invention

The present invention relates to an automatic non-destructive case depth measuring instrument.

2. Description of the Prior Art

In measuring the hardened depth, of a steel, there has heretofore been employed a method which comprises preparing a small test sample by breaking a piece of the steel to be tested and conducting a chemical analysis on said sample. However, such a method had the serious disadvantage that it was very inefficient and not applicable to certain types of steel. In order to overcome such disadvantages, the applicant has previously proposed a case depth measuring instrument such as disclosed in U.S. Pat. Application Ser. No. 20,218. The instrument disclosed in the aforesaid U.S. Pat. Application is designed to measure the hardened depth of a steel ky impressing a D.C. magnetic field locally on the hardened case of the steel, measuring the magnetic flux density of said field by means of a magnetic field density detecting element while varying the magnetomotive force of said field, and reading the value of the coercive force of said field at the point when the magnetic flux density has reached zero. However, the instrument has such practical problem that the measuring operation is cumbersome and takes a long time, as the steps of the operation are all performed manually.

SUMMARY OF THE INVENTION

The present invention has been achieved to deal with the above-mentioned problem. Namely, an object of the invention is to automatically and non-destructively measure the hardened depth of a steel to be tested.

Another object of the invention is to provide a steel testing instrument which does not comprise mechanical elements, such as a rotary switch element, is simple in maintenance and efficient in operation, and can be provided in a compact form.

DESCRIPTION OF THE PREFERRED EMBODIMENT

Figure 1:
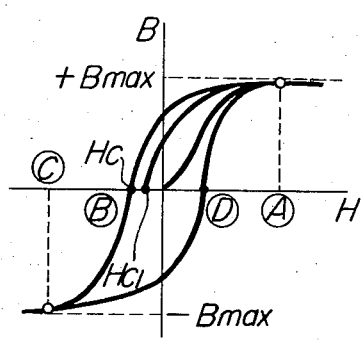
FIG. 1 is a graph showing the hysteresis curves of steel.

In FIG. 1 which shows the magnetic hysteresis curves of steel at a quenched portion and an unquenched portion respectively, symbol $Hc_1$ indicates the coercive force of the unquenched portion and Hc the coercive force of the quenched portion. In general, the coercive force is greater at the quenched portion than at the unquenched portion.

Figure 2:
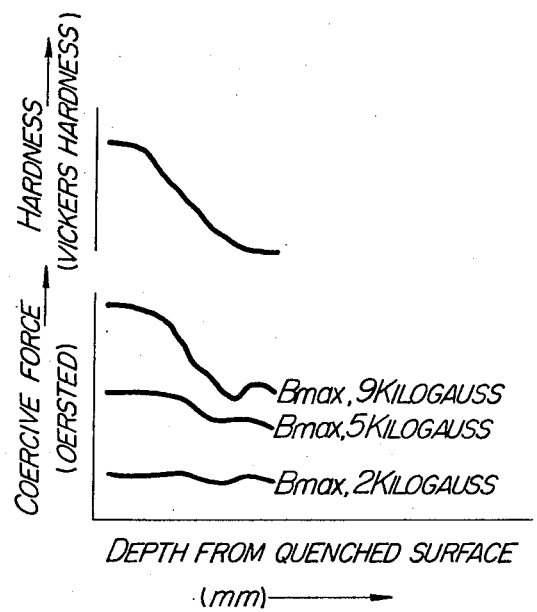
FIG. 2 is a graph showing the relationship between the hardness and coercive force, and the depth of a quenched layer of steel.

Further, as will be seen from the experimental results of FIG. 2, the coercive force of steel decreases with the hardness which varies as the depth from the quenched surface increases. In FIG. 2, symbol Bmax is the maximum flux density shown in FIG. 1.

Generally speaking, a quenched layer is not distinctive in forged steel rolls, etc., as shown in FIG. 2. Namely, the steel shows a substantially constant hardness to a certain depth from the surface thereof and then the hardness decreases gradually as the distance from the surface increases.

However, since the coercive force varies with hardness, the approximate depth of the quenched layer can be judged by penetrating a magnetic flux density sufficiently deeply from the steel surface and then measuring the mean coercive force of the flux penetrating portion.

Figure 3:
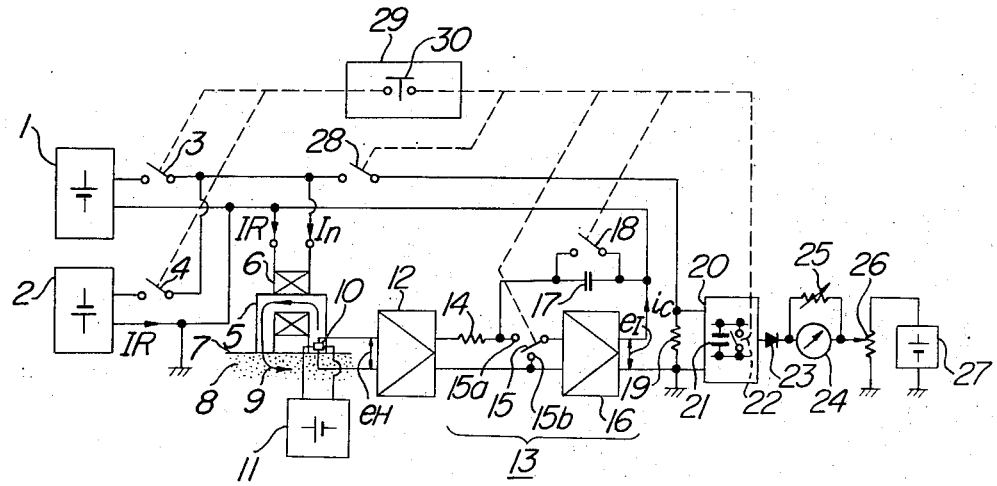
FIG. 3 is a diagram showing the construction of one embodiment of the present invention.

An embodiment of the present invention, which measures hardened depth based upon the above-described principle, will be described hereunder with reference to FIG. 3:

Referring to FIG. 3, reference numeral 1 designates a D.C. exciting power source of positive polarity, 2 a D.C. exciting power source of negative polarity, 3 a switch for the power source 1, 4 a switch for the power source 2, 5 a coercive force measuring electromagnet having an exciting coil 6, which is excited from said power sources 1, 2. Reference numeral 7 designates a steel to be tested (hereinafter referred to simply as a sample) which has a quenched layer 8. Reference numeral 9 designates a magnetic flux passing through a magnetic path formed by the quenched layer 8 and a core of the electromagnet 5, 10 a magnetic flux density detecting Hall generator disposed in the magnetic field provided by the electromagnet 5 for detecting the density of the magnetic flux 9, 11 a power source for supplying a control current to the Hall generator 10, 12 a forward stage amplifier for amplifying an output of the Hall generator, and 13 an integration circuit including a resistor 14, an input side switch 15, a main amplifier 16, a feedback capacitor 17 and a discharge switch 18 for the capacitor 17. Reference numeral 19 designates a resistor for converting a current, corresponding to the coercive force, into voltage, 20 designates a memory circuit including a memory element 21 in the form of a capacitor and a switch 22 for clearing the value stored in the memory element 21 23 designates a reverse flow preventing diode, 24 designates an indicator, 25 designates a variable resistor for adjusting the sensitivity of the indicator 24, 26 designates a resistor for setting a zero level of the indicator 24, and 27 designates a reference voltage generating circuit which applies a predetermined voltage to the zero level setting resistor 26. Reference numeral 28 designates a switch for supplying the output of the integration circuit 13 to the coil 6 therethrough, and 29 designates a signal generating circuit for controlling the switches 3, 4, 15, 18, 22 and 28 mentioned above. The signal generating circuit 29 includes a push-button 30 and is driven as by a motor (not shown) rotating according to a timed program.

The automatic case depth measuring instrument of the invention is constructed as described above, but its essential portion is broadly composed of four elements consisting of the magnetizing power sources 1, 2, the magnetic field generating electromagnet 5, the integration circuit 13 and the indicator 24 for indicating the hardened depth.

Figure 4:
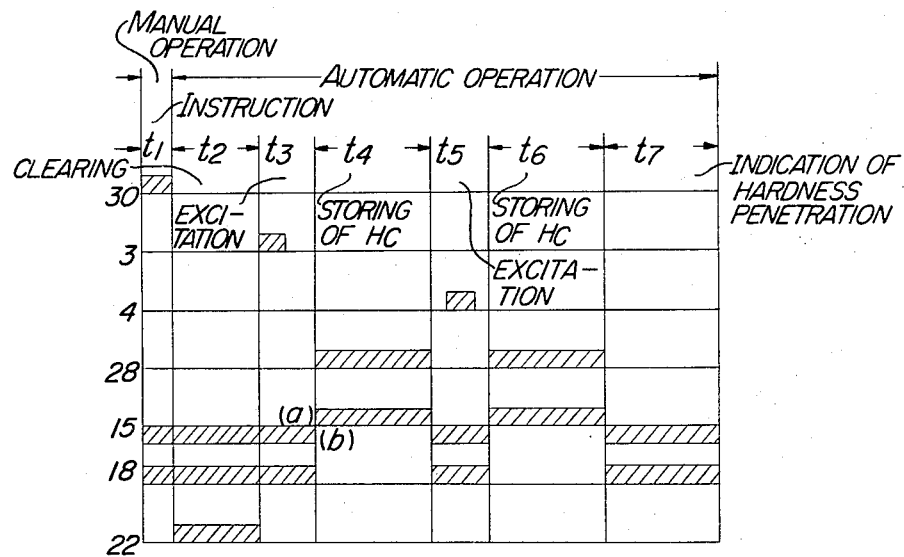
FIG. 4 is a diagram showing the operational characteristics of the respective switches in the instrument of FIG. 3.

The operation of the case depth measuring instrument described above will be explained with reference to FIGS. 4 and 5. FIG. 4 shows the open and closed states of the switches 3, 4, 15, 18, 22, 28 and 30, in which the hatched portions indicate the period in which the pertinent switches are held closed.

Figure 5:
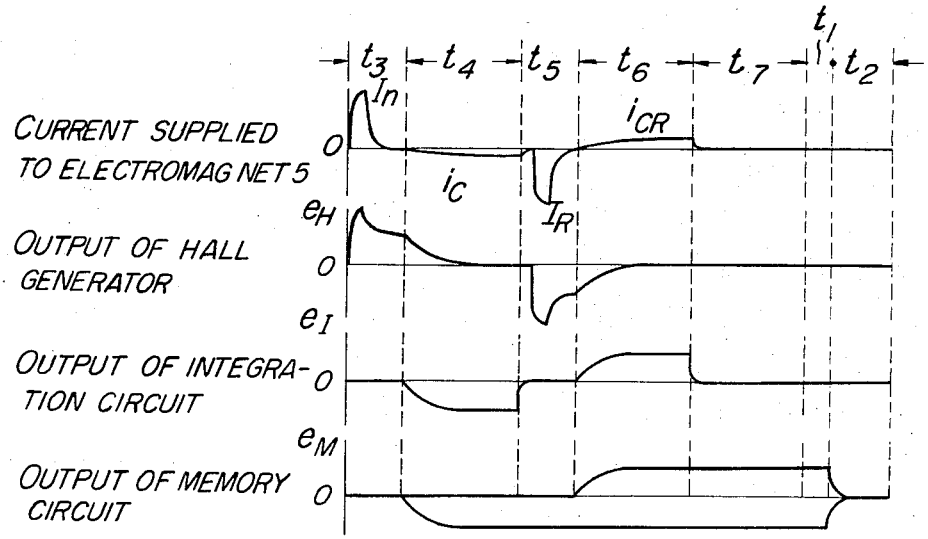
FIG. 5 is a diagram showing the waveforms at various portion of the instrument of FIG. 3.

In the arrangement, when the switch 3 for the power source 1 is closed, with the switch 15 in engagement with a terminal 15b and the switch 18 being held in a closed position respectively, a current $I_n$ is supplied instantaneously from the power source 1 to the exciting coil 6 of the electromagnet 5 as shown in FIG. 5, to excite said electromagnet 5. Thus, the quenched layer 8 of the sample 7 is sufficiently excited by the magnetic flux density created by said electromagnet 5, up to the point A in FIG. 1.

Then the switch 3 is opened, whereupon a residual flux 9 remains in the electromagnet 5, which is detected by the Hall generator 10. The Hall generator 10, therefore, generates an output $e_H$ as shown in FIG. 5, which is amplified by the forward stage amplifier 12 and applied to the integration circuit 13. When the switch 15 is brought into contact with a terminal 15a and the switch 18 is opened at this time, the integration circuit 13 integrates the signal $e_H$ and generates an output $e_I$. The switch 28 is closed simultaneously with the opening of the switch 18, to supply a current $i_c$ of an opposite polarity to the current $I_n$ to the electromagnet 5 by means of the output $e_I$. The residual flux of the electromagnet D5 is attenuated and the output $e_H$ of the Hall generator 10 decreases. However, the integration circuit 13 continues integration as long as the Hall generator 10 generates the output $e_H$ and, therefore, the current $i_c$ being supplied to the exciting coil 6 of the electromagnet 5 is continuously increased until the output $e_H$ of the Hall generator 10 becomes zero.

The magnetic flux density of the quenched layer 8 of the sample 7 moves from the point A towards the point B and reaches the point B in FIG. 1, whereupon the output $e_H$ of the Hall generator 10 becomes zero and the integration circuit 13 stops its integration operation.

With $I_c$ representing the current at this time and N representing the number of turns of the exciting coil 6, the product of $I_c \times N$ has a close relation with the product of $H_c \times d$ wherein $H_c$ represents the coercive force of the quenched layer 8 and $d$ represents the depth of the same. The depth of the quenched layer of the sample 7 can be determined based on this relation.

The current $i_c$ from the integration circuit 13 at the point when the output $e_H$ of the Hall generator 10 becomes zero, is in proportion to the coercive force $H_c$ and the size of this current $i_c$ is obtained as a terminal voltage of the resistor 19 and stored in the memory circuit 20.

Then, the instrument is returned to the original state by opening the switch 28, bringing the switch 15 into contact with the terminal 15b and closing the switch 18. Thereafter, the switch 4 is closed to supply a current $I_R$ of the opposite polarity to the power source 1, from the power source 2 to the exciting coil 6 of the electromagnet 5 as shown in FIG. 5, to excite said exciting coil 6. As a result, the electromagnet 5 is energized and the polarity of the residual flux in the sample 7 is reversed and further the magnetic position of the quenched layer 8 of the sample 7 moves from the point B towards the point C in FIG. 1. In this case, the output $e_H$ of the Hall generator 10 is also reversed in polarity as shown in FIG. 5 and hence the output $e_I$ of the integration circuit 13 is also reversed in polarity. Therefore, the current $i_{CR}$ supplied by the output $e_I$ of the integration circuit 13 to the exciting coil 6 of the electromagnet 5 is opposite in polarity to the current $I_R$ and the residual flux 9 is attenuated by the closure of the switch 28. The output $e_H$ of the Hall generator 10 drops incident to the closure of the switch 28, but the output of the integration circuit 13 continues to increase until the output $e_H$ becomes zero, and thus the magnetic position of the quenched layer 8 of the sample 7 moves from the point C towards the point D in FIG. 1. When the magnetic position has reached the point D, the output $e_H$ of the Hall generator 10 becomes zero and the integration operation of the integration circuit 13 is ended. The output $e_H$ of the integration circuit 13 is introduced into the memory circuit 20 through the resistor 19 and thus the sum of the two measurements is stored in said memory circuit 20. Although the memory circuit 20 is shown as being composed only of a set of the memory element 21 and the switch 22 for the sake of simplicity, it should be understood that said memory circuit also includes another memory element in the form of a capacitor for storing a negative output voltage of the integration circuit supplied thereto and a switch, in addition to the memory element 21 and the switch 22. Therefore, it will be understood that the output stored in the memory element 21 will not be offset. As stated above, the coercive force $H_c$ of the quenched layer 8 of the sample 7 is measured twice by revering the polarity of the residual flux remaining therein. This is for the purpose of eliminating any error caused by the temperature characteristic of the flux detecting Hall generator 10, thereby improving the accuracy of measurement.

Thus, in the memory circuit 20, the two values of voltage corresponding to the two values of coercive force measured with reverse polarities are stored in the two memory element capacitors, respectively, as described above, and then they are added in the same polarity so as to be fed to the indicator 24 through the diode 23. Although the added voltage fed to the indicator 24 corresponds to the sum of the two values of coercive force measured consecutively with reverse polarities, the indicator is capable of indicating the average value of the two measurements by pre-adjusting the range of the indicator. The coercive force obtained in the manner described above represents the coercive force of the sample steel 7 proper when a material having a very small coercive force is used for the core of the electromagnet 5. If the electromagnet 5 is selected such that the magnetic flux density created thereby penetrates sufficiently deeper than the depth of the quenched layer 8 of the sample steel 7 from the surface thereof, the coercive force measured will be the mean value of coercive force, and the quenched layer and a portion deeper than that show different coercive forces respectively as shown in FIG. 2. After all, the measured coercive force wild correspond to the hardened depth.

Therefore, by previously calibrating the instrument with a test sample having a specific hardened depth, the hardened depth of the steel 7 to be tested can be determined automatically and non-destructively.

Now, the timing of the opening and closure of the respective switches 3, 4, 15, 18, 22 and 28, in the operation for measuring the hardened depth with the testing instrument of the instant invention as described above, will be explained with reference to FIG. 4.

In the testing instrument of the invention, an arrangement is made such that when the push-button 30 is depressed at the time period $t_1$ to set the instrument in operation for the measurement of the hardened depth of the sample, a control signal is generated from the switch controlling signal generating circuit 29 at a predetermined time interval and the respective switches are automatically actuated one after another in response to said control signal.

Namely, the time period $t_2$ is the time required for erasing the memory of the memory circuit 20 and the switch 22 is held in a closed position just during this period. In the time period $t_3$, the switch 3 is closed and again opened, whereby the exciting current $I_n$ is momentarily supplied to the exciting coil 6 of the electromagnet 5. In this case, the switch 15 is in engagement with the terminal 15b; the switch 18 is held closed and the switch 22 is open. In the time period $t_4$, the switch 28 is held closed and the switch 15 is held in engagement with the terminal 15a and further the switch 18 is held open. Thus, the current $i_c$ corresponding to the coercive force $H_c$ is stored in the memory circuit 20. Within the time period $t_5$, the switch 4 is held closed during a certain period and the current $I_R$ of the opposite polarity to the current $I_n$ is momentarily supplied to the exciting coil 6 of the electromagnet 5. In the time period $t_6$, the current corresponding to the coercive force is stored in the memory circuit 20 and in the time period $t_7$ said current or the coercive force is indicated on the indicator 24. Further, in the time period $t_1$ an instruction for the next measuring operation is given to the instrument and in the time period $t_2$ all the outputs stored in the memory circuit during the preceding cycle of measuring operation are reduced to zero, providing for the next cycle of measuring operation. Thus, it will be seen that a series of measuring operation are performed by the testing instrument automatically, only by pushing the instruction button 30 once.

As will be clearly understood from the foregoing description, according to the present invention the hardened depth of a given steel material, is measured by disposing a magnetic flux density detecting element in the magnetic field of an electromagnet which magnetizes the steel, integrating the output of the detecting element by an integration circuit, feeding the output of said integration circuit to the coil of said electromagnet so as to offset the residual magnetic flux density of the steel, reducing the output of said magnetic flux density detecting element to zero and measuring the current supplied from said integration circuit at the point when the output of said integration circuit and the output of said magnetic flux density detecting element are balanced, and furthermore the above-described measuring operation is effected automatically, according to a pre-set timed program.

Therefore, the case depth measuring instrument of the invention has such remarkable advantages that the hardened depth of a given steel material can be measured automatically and non-destructively, that the operation of the instrument is highly reliable since the instrument is composed of solid circuits free of mechanical rotating or sliding elements, such as a servo-motor or a sliding resistor, and that, therefore, the instrument is not only simple in construction, light in weight and small in size, but also simple in operation and maintenance. In addition, the carbon content of steel is also measurable by measuring the coercive force of the steel according to the present invention.

We claim:

1. An automatic case depth measuring instrument comprising an electromagnet for applying D.C. magnetic field to a steel to be tested locally on a hardened case thereof from a surface of the case;

a D.C. electric power source for exciting said electromagnet;

a magnetic flux density detecting element disposed in the magnetic field created by said electromagnet for measuring the magnetic flux density of said magnetic field thereby producing a first electric output signal;

an integration circuit connected to the output of said detecting element for integrating said first electric output signal thereby producing a second electric output signal;

switch means for alternately supplying said electromagnet with a D.C. current from said D.C. electric power source to initially excite said electromagnet so as to magnetically saturate said steel and subsequentally with said second electric output signal to decrease said magnetic flux density in said steel to zero;

control means for automatically controlling the operation of said switch means to supply said electromagnet with the current from said D.C. electric power source and thereafter with said second electric output signal; and indicator means connected to said integration circuit for indicating the value of said second electric output signal at the point when the value of said first electric output signal has reached zero while said second electric output signal is applied to said electromagnet.

2. An automatic case depth measuring instrument as defined in claim 1, said instrument further comprising a second D.C. electric power source for exciting said electromagnet, the two D.C. electric power sources being selectively connected to excite said electromagnet with opposite polarities by said switch means under control of said control means in successive sequences with the application of said second electric output signal in each sequence thereby measuring with reversed polarities the value of said second electric output signal at the point when the value of said first electric output signal has reached zero while said second electric output signal is applied to said electromagnet, said indicator means being calibrated to indicate the average of said twice measured value.

3. An automatic case depth measuring instrument as defined in claim 1 wherein said control means includes means to control said switch means according to a preset timed program.

4. An automatic case depth measuring instrument as defined in claim 1 wherein said switch means includes means to disable said integration circuit while said electromagnet is excited by the current from said D.C. electric power source.

5. An automatic case depth measuring instrument as defined in claim 2 wherein storage means is connected between said integration circuit and said indicator means for storing the value representative of said second signal at each polarity.

6. An automatic case depth measuring instrument comprising an electromagnet for applying a D.C. magnetic field locally on the hardened case surface of a steel to be tested, a D.C. electric power source for exciting said electromagnet, magnetic flux density detecting means disposed in the magnetic field created by said electromagnet for measuring the magnetic flux density of said magnetic field thereby producing a first electric output signal, an integration circuit selectively connected to the output of said detecting element for integrating said first electric output signal thereby producing a second electric output signal at an output connected to said electromagnet, indicator means for indicating the value of said second electric output signal, switch means for connecting said D.C. electric power source to said electromagnet alternately with the connection of said integration circuit to said magnetic flux density detecting means and said indicator means to said electromagnet, and control means for automatically controlling the operation of said switch means according to a preset timed program.

7. An automatic case depth measuring instrument as defined in claim 6 wherein first and second D.C. electric power sources of opposite polarity are provided for exciting said electromagnet and said switch means includes first and second switches controlled by said control means for connecting said first and second power sources to said electromagnet.

8. An automatic case depth measuring instrument as defined in claim 7 wherein said switch means further includes a third switch actuatable to connect the input of said integration circuit to the output of said detecting means and a fourth switch actuatable to connect said indicator means to said electromagnet, said third and fourth switches being actuated simultaneously by said control means alternately with the operation of said first and second switches.

9. An automatic case depth measuring instrument as defined in claim 8 wherein storage means is connected between said integration circuit and said indicator means for storing the value representative of said second signal at each polarity.

10. An automatic case depth measuring instrument as defined in claim 9 wherein said switch means further includes a fifth switch actuatable by said control means during actuation of either of said first and second switches to disable said integration circuit.

* * * * *